United States Patent [19]
Hurley et al.

[11] Patent Number: 6,048,190
[45] Date of Patent: Apr. 11, 2000

[54] EDGE CLAMP FOR A LAMINATING PRESS

[75] Inventors: John Hurley, Goshen; Gregory S. Rife, Middlebury, both of Ind.

[73] Assignee: Coachmen Industries, Inc., Elkhart, Ind.

[21] Appl. No.: 09/149,915

[22] Filed: Sep. 9, 1998

[51] Int. Cl.⁷ .................................................. B29C 70/44
[52] U.S. Cl. ........................ 425/389; 425/405.1; 156/382
[58] Field of Search .................... 425/389, 390, 425/405.1; 156/382, 285; 264/571

[56] References Cited

U.S. PATENT DOCUMENTS

| | | | |
|---|---|---|---|
| 4,637,789 | 1/1987 | Netznik | 425/89 |
| 5,370,521 | 12/1994 | McDougall | 425/405.1 |
| 5,683,526 | 11/1997 | Guilmette et al. | 156/285 |
| 5,772,950 | 6/1998 | Brustad et al. | 425/389 |

*Primary Examiner*—Robert Davis
*Assistant Examiner*—Thukhanh T. Nguyen
*Attorney, Agent, or Firm*—Price, Heneveld, Cooper, DeWitt & Litton

[57] ABSTRACT

The frame of a laminating press includes a plurality of spaced-apart fixed threaded fasteners over which an edge of a vacuum bag having apertures aligned with such fasteners is placed. Subsequently, a backing bar having aligned apertures is placed over the vacuum bag and second threaded fasteners are secured to the first-named threaded fasteners for clamping the edge of the vacuum bag between the channel and backing bar. In a preferred embodiment, the channel is substantially C-shaped providing a serpentine pathway and attachment of the edge of the vacuum bag to the laminating press frame, thereby securely holding the edge of the vacuum bag thereto. In a preferred embodiment also, a sealing pad is positioned on the lower surface of the frame to improve the vacuum seal between the vacuum bag and the lower adjacent table on which the part to be laminated is placed.

20 Claims, 3 Drawing Sheets

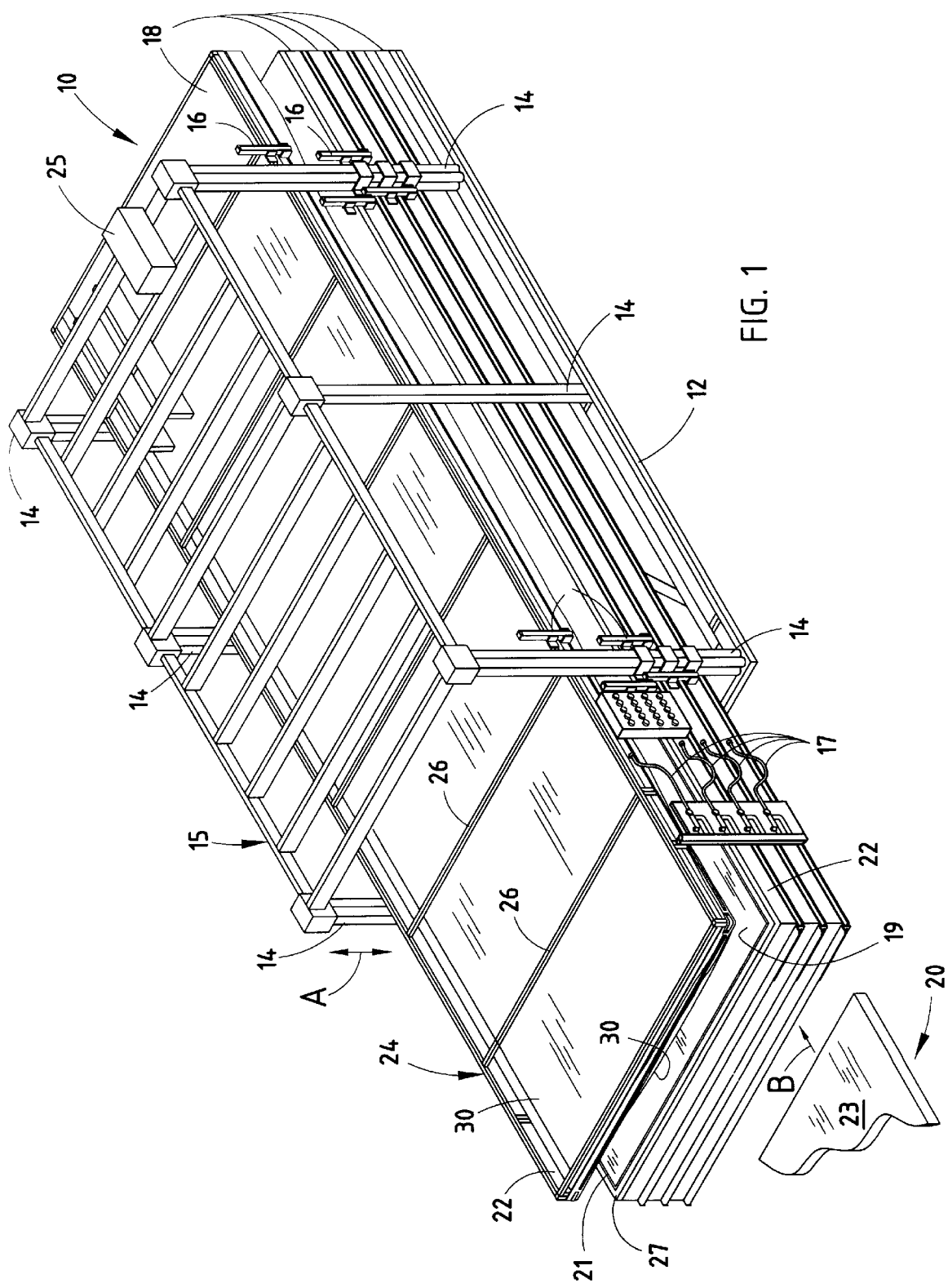

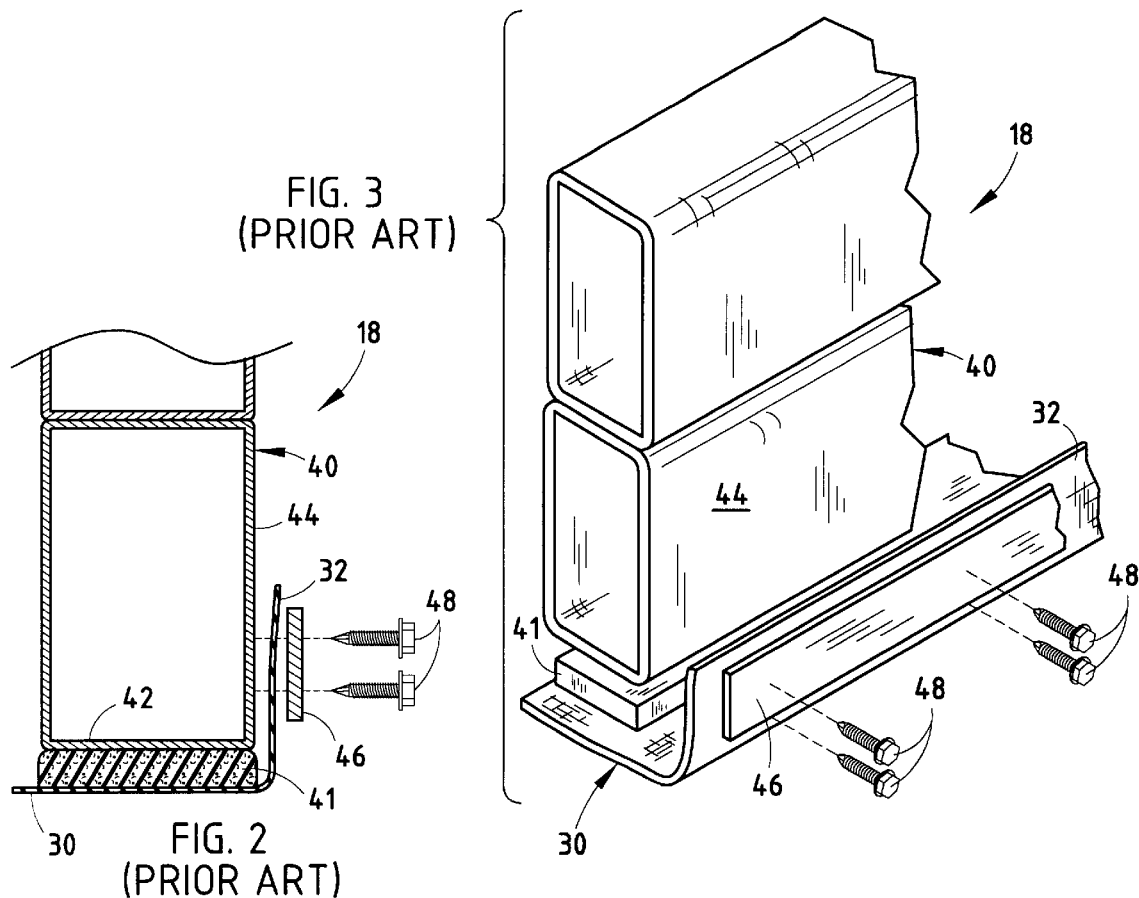
FIG. 3 (PRIOR ART)
FIG. 2 (PRIOR ART)
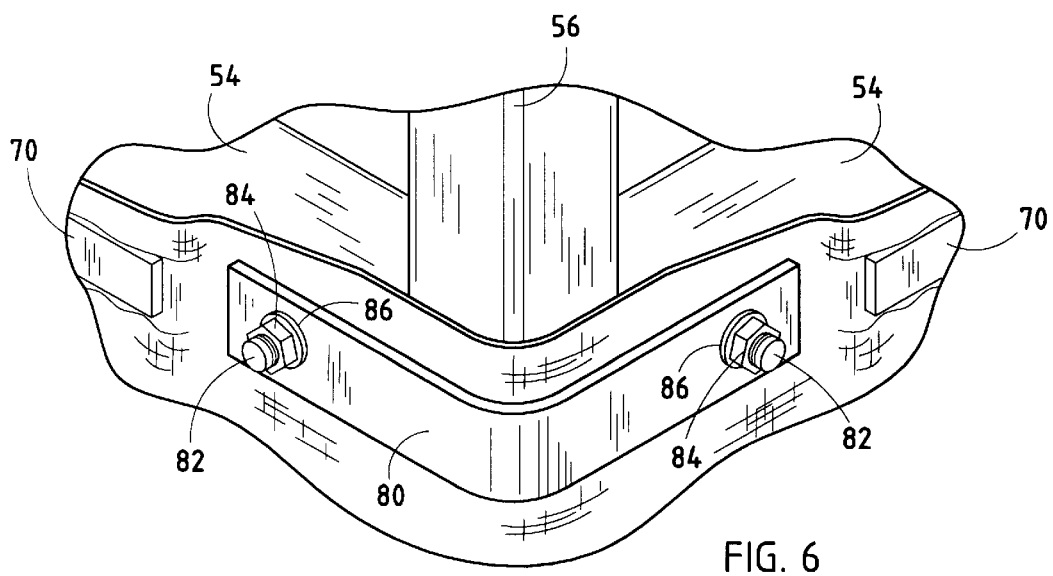
FIG. 6

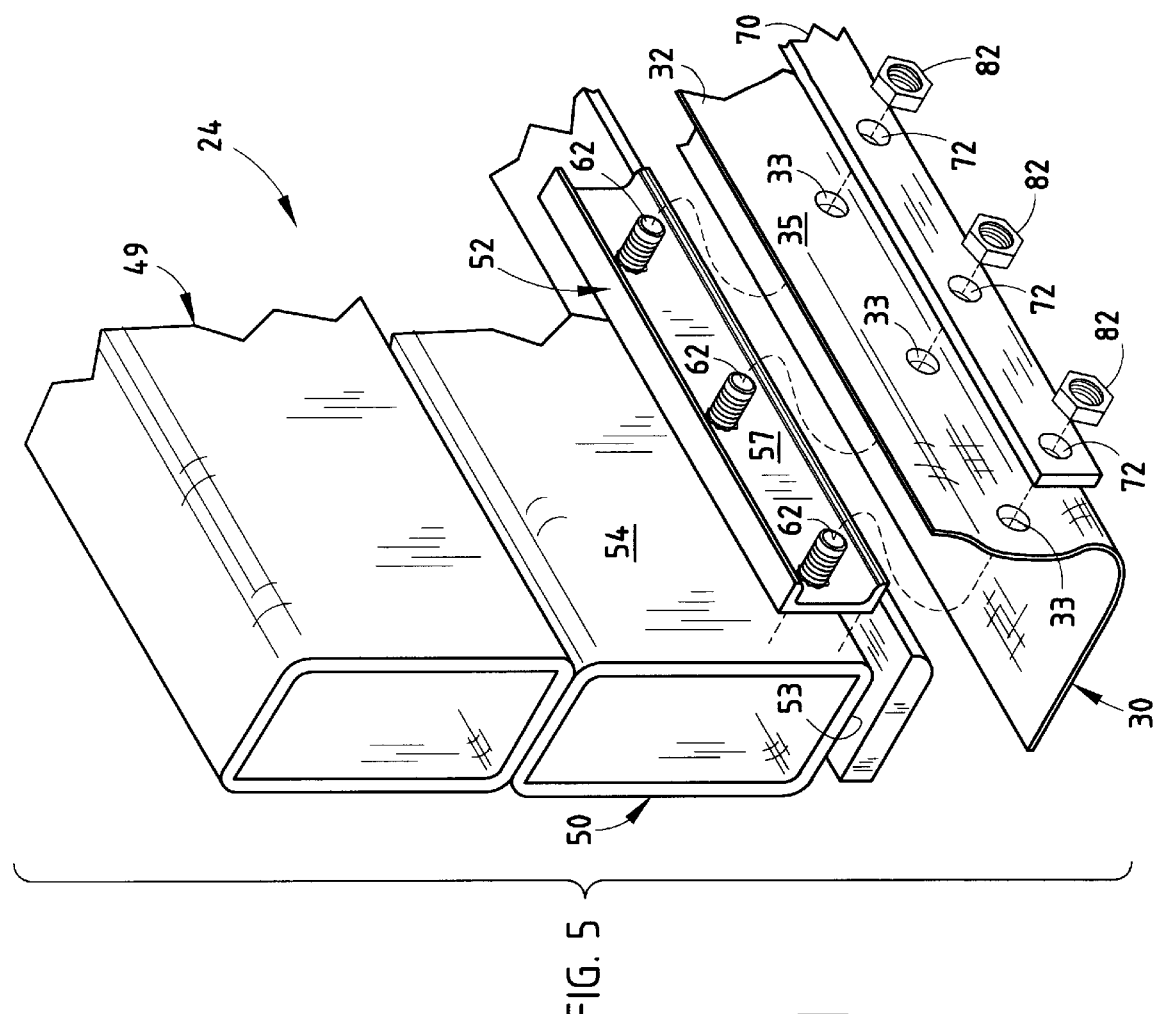
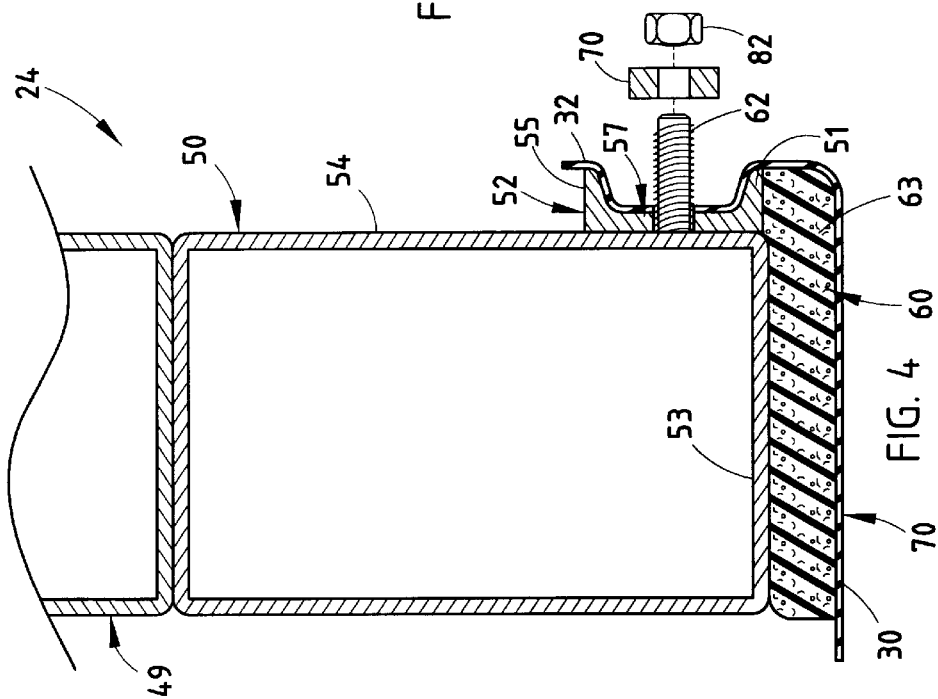

EDGE CLAMP FOR A LAMINATING PRESS

BACKGROUND OF THE INVENTION

The present invention relates to a laminating press for large recreational vehicle panels and particularly to an improved clamping mechanism for the edges of a vacuum bag employed in connection with the laminating press.

The walls and ceiling of recreational vehicles, such as motor homes, trailers and the like, are laminated in large laminating presses which can manufacture up to 10'×40' sheets of material, which includes an outer surface, an intermediate insulated surface, and an interior panel for the recreational vehicle in very large presses. The laminating tables or presses are typically approximately 42' in length and have a width of approximately 13.5' and include up to four tiers for simultaneously laminating four panels once loaded into the laminating table. The laminating process involves laying the preglued laminate onto a fiberglass reinforced plywood (FRP) table and lowering a flexible air impervious sheet of material typically referred to as a vacuum bag, over the top of the part to be laminated and subsequently drawing a vacuum around the edges of the vacuum bag to apply even pressure on the surface of the recreational vehicle panel for a period of time sufficient to allow the adhesive employed for laminating the layers of panel together to cure. The vacuum bags provide a resilient surface which does not scratch the surface of the recreational vehicle panel and provide uniform laminating pressure across the surface of the panel, thereby effectively pressing the layers of laminate together during curing.

Existing vacuum bags used in connection with such laminating presses have edges which have been attached to a channel frame of the laminating table by the use of a backing bar and self-threading screws which extend directly through the vacuum bag material into the channel of the frame for the laminating table. As can be appreciated, with significant use of such tables, this attachment structure for the laminating press can result in tears around the edges of the fabric, reducing the effectiveness of the vacuum drawing the vacuum bag downwardly onto the part to be laminated. Replacing the vacuum bag results in numerous holes being formed into the channel frame of the laminating press. This ultimately weakens the frame, requiring its replacement. As a result of this construction, the vacuum bags of the prior art have been less than perfectly effective in forming a vacuum seal during the laminating process and their replacement has resulted in the weakening and ultimate destruction of the channel frame for the laminating press.

There exists, therefore, a need for an improved structure for attaching the vacuum bags to the laminating press of the type employed for manufacturing large panels for recreational vehicles and one which does not result in the weakening of the laminating press frame and which provides an improved vacuum seal for the bags during the laminating process.

SUMMARY OF THE INVENTION

The system of the present invention accommodates these goals by providing an elongated, continuous channel extending around the outer periphery of the frame. The channel includes a plurality of first spaced-apart fixed threaded fasteners over which the edge of a vacuum bag, having apertures aligned with such fasteners, is placed. Subsequently, a backing bar having aligned apertures is placed over the vacuum bag and second threaded fasteners are secured to the first threaded fasteners for clamping the edge of the vacuum bag between the channel and backing bar.

In a preferred embodiment of the invention, the channel is substantially C-shaped providing a serpentine pathway and attachment of the edge of the vacuum bag to the laminating press frame, thereby securely holding the edge of the vacuum bag thereto. In a preferred embodiment of the invention, also, a pad is positioned in the lower surface of the frame to improve the vacuum seal between the vacuum bag and the lower adjacent table on which the part to be laminated is placed.

Replacement of a vacuum bag with such a system requires removal of the second fasteners from the first fasteners, removal of the clamping bar and reattachment of a new vacuum bag over the existing fasteners and reattachment of the backing bar and fasteners. No new holes are formed in the frame of the laminating press, which thereby retains its original strength, thereby lasting substantially indefinitely through changes of numerous vacuum bags.

These and other features, objects and advantages of the present invention will become apparent upon reading the following description thereof together with reference to the accompanying drawings.

BRIEF DESCRIPTION OF THE DRAWINGS

FIG. 1 is a perspective view of a laminating press embodying the present invention, shown partially in pictorial form;

FIG. 2 is an enlarged fragmentary vertical exploded cross-sectional view of a prior art structure for attaching a vacuum bag to a channel of a table of a laminating press;

FIG. 3 is a fragmentary exploded perspective view of the structure shown in FIG. 2;

FIG. 4 is an enlarged fragmentary vertical cross-sectional view of the structure of the present invention employed for attaching a vacuum bag to a laminating press frame;

FIG. 5 is a fragmentary exploded perspective view of the structure shown in FIG. 4; and FIG. 6 is a fragmentary perspective view of one of the corner attachments of the vacuum bag of the present invention.

DETAILED DESCRIPTION OF THE PREFERRED EMBODIMENT

Referring initially to FIG. 1, there is shown a laminating table or press 10 embodying the present invention and which includes a generally rectangular frame 12 defining the base of the press from which there upwardly extends six vertically extending posts 14 with three spaced posts on either side of the press. Individual tiers or tables 18 are movably mounted to the posts and controlled by hydraulically operated cylinders 16 positioned between various tiers of the laminating press 10 such that the tiers can be selectively individually opened for the insertion of a part 20 to be laminated. As can be appreciated, the laminating press 10 includes a plurality of vertically spaced individual tiers or tables 18 which, depending on the size of the press, can accommodate up to four vertically spaced panels 20 between two adjacent tables 18. The panels are successively loaded into the laminating press 10 after the application of a bonding agent in a loading station located to the left of the press 10 as shown in FIG. 1.

For purposes of describing the present invention, only the uppermost tier 18 is described in detail. Each of the tiers 18 are movably mounted to the posts 14 in a conventional manner so that they can move upwardly and downwardly in the direction indicated by arrow A in FIG. 1 selectively under the control of hydraulic cylinders 16 to open the laminating press such that part 20 can be positioned between vertically spaced adjacent tiers 18. Each of the tiers 18 includes a horizontally extending support surface 19 typically comprising fiberglass reinforced plywood (FRP) mounted to a channular frame 22 which is generally rectangular and extends the width and length of each of the tiers. The uppermost tier 18 does not include a fiberglass reinforced work surface but only need support a vacuum bag 30 which is mounted to the frame 22 as described in greater detail below. Frame 22, therefore, can be somewhat smaller than the remaining frames since it does not support the press surface 19 but only supports a vacuum bag 30. Coupled to frame 22 for providing structural rigidity is a super structure frame 24 which is generally rectangular and includes cross members 26 at spaced locations therealong to provide rigidity to the uppermost frame 22. Press 10 also includes a fixed upper frame 15 which is generally rectangular with longitudinal struts and cross members to support posts 14 and a variety of control mechanisms shown pictorially as element 25 in the drawing and which includes, inter alia, a vacuum pump and reservoir tank coupled to the vacuum tables associated with each of the tables 18 through suitable flexible couplings 17 and valves in a conventional manner.

Each of the tables 18 includes adjacent the work surface 19 a generally U-shaped vacuum groove or channel 21 extending around the periphery of each of the work surfaces 19 and which are coupled to the vacuum system 25 through conduits running adjacent posts 14 and along upper frame 15. Part 20, to be laminated and which has previously had an adhesive applied to the various sheets, is inserted into the press in the direction indicated by arrow B adjacent and between vertically spaced-apart tables 18 with a vacuum bag 30 located on the upper surface 23 of the part 20 and the work surface 19 supporting the part itself. Upon insertion, the uppermost table 18 is lowered onto the part 20 and a vacuum drawn in channel 21 for providing a laminating force uniformly across the surface of the part 20 which is supported on its underside by the work table 19. After curing, which takes approximately 60 minutes, the press is sequentially unloaded. In the past, the loading and unloading process has been manual and the vacuum bags have been attached as shown in FIGS. 2 and 3 and now described.

In FIGS. 2 and 3, a generally rectangular channel 40 of a conventional laminating press table 18 is shown with a vacuum bag 30 having an edge 32 extending under the lower edge 42 of the frame which faces downwardly toward the next adjacent vertically spaced table. In the past, a foam tape 41 has been positioned against and in attachment to the lower edge 42 of channel 40 to provide some cushioning for the junction of vacuum bag 30 and channel 40, with the foam tape having a thickness of approximately ¼". The edge 32 of vacuum bag 30 extends upwardly adjacent the side 44 of the channel 40 of the frame. A backing bar 46 of 1" flat 16-gauge metal stock is placed against the outer surface of edge 32 of the vacuum bag and self-tapping screws 48 are driven through the fabric of the vacuum bag 30 itself and into the side wall 44 of channel 40 forming apertures through the bar 46 as well as into the side 44 of the channel 40 forming the frame for the table 18.

As can be appreciated, with the continued use of the laminating press, replacement of vacuum bag 30 becomes necessary. With repeated replacement of the vacuum bag and repeated insertion of self-tapping screws into channel 40, the channel 40 ultimately becomes weakened, and the entire frame of the table must be replaced. Additionally, drilling the selftapping screw 48 through the fabric of the flexible vacuum bag 30 tends to initiate tears in the fabric which can lead to premature fatigue and ripping of the vacuum bag during its use. The foam tape 41, which extends only directly under the lower edge 42 of channel 40, does not fully extend the width of support surface 19 of the adjacent table 18, thereby making it somewhat difficult for a tight seal to be formed on the outer peripheral edge 27 (FIG. 1) of the work surface 19. In order to overcome these problems with the prior art, as shown in FIGS. 2 and 3, the attachment structure for a vacuum bag 30 of the present invention, as shown in FIGS. 4–6, has been developed and is now described.

Initially, it is noted that the vacuum bag 30 is mounted to be suspended from each of the frames facing downwardly toward the adjacent work surface 19 below the vacuum bag. This drooping of the vacuum bag is best seen in FIG. 1 where the uppermost bag 30 is shown. The vacuum bags are typically a flexible membrane and are made of a flexible material having a thickness of about 0.045" and. in the preferred embodiment, are made of an ethylene propylene diene monomer (EPDM) rubber material, which is commercially available in relatively large continuous sheets, cut to span the frame 24 of the table. In the embodiment shown in FIGS. 1 and 4–6, the frame 24 of each of the vacuum tables 18 includes upper and lower channels 49 and 50, respectively, which are conventionally mounted to each other. Each channel 49, 50 is a 2"×4" 11 gauge steel tubing. Welded to channel 50 is a continuous ⅛" by 1" steel C-shaped channel 52 extending along the lower edge of each of the longitudinally extending channels 50 defining the generally rectangular frame 24. Channels 52 terminate, as seen in FIG. 6, a few inches from each of the corners 56 of the channels 50 to allow a corner seal to be formed as described in greater detail below in connection with FIG. 6. The channels 52 are welded to the lower edge of channel 50 with a lower flange 51 substantially flush with the lower surface 53 of channel 50. Lower flange 51 of C-shaped channel 52 thus extends laterally outwardly beyond the side wall 54 of channel 50 providing an additional horizontal surface to which a high density polyurethane seal 60 is attached, which is mounted both to the lower wall 53 of channel 50 by means of a suitable adhesive and to the lower flange 51 of channel 52 to thereby extend the overall width of the sealing surface 70 defined by the vacuum bag 30 which extends around seal 60 and in a serpentine fashion around the C-shaped channel 52, as best seen in FIGS. 4 and 5. The polyurethane seal 60 is commercially available KC1700-25 polyurethane having a width of approximately 2 ¼", thereby extending over the additional sealing area 63 (FIG. 4) approximately ¼" corresponding to the width of lower flange 51 of C-channel 52.

Spaced along the center web 57 of channel 52 at spaced locations therealong are first threaded fasteners 62 comprising in the preferred embodiment ¼"×20" studs welded to the wall of web 57 centered between the lower flange 51 and upper flange 55 thereof. The edge 32 of vacuum bag 30 is perforated by a hole punch to include a plurality of apertures 33 which align with and overly fasteners 62. A ¼"×⅝" flat bar 70 also includes a plurality of spaced apertures 72 aligned with fasteners 62 and apertures 33 of vacuum bag edge 32 to fit over and behind the vacuum bag edge, securing the edge 32 of vacuum bag 30 between the flanges 51 and 55 of channel 52. A ¼"×20" second treaded fastener 82 comprising a threaded nut is threadably fitted over the ends of each of the stud fasteners 62, thereby compressibly holding the backing plate 70 against the outer surface 35 of edge 32 of the vacuum bag 30 and within channel 52, as seen in FIGS. 4 and 6. Each of the four corners 56 of the rectangular frame are sealed by means of an angle bracket 80 which is similarly attached to threaded studs 82 which are secured directly to the wall 54 of lower channel 50 utilizing a threaded nut 84 and lock washer 86 to provide a seal for the vacuum bag at each of the four corners of the frame.

Thus, with the attachment system of the present invention, a vacuum bag can be replaced relatively quickly without damage to the channel frame of the vacuum table itself utilizing threaded fasteners such as nuts which can be driven over the outwardly projecting studs with the vacuum bag being securely held against movement through its serpentine attachment to the C-shaped channel of the preferred embodiment, thereby increasing its longevity during its repeated cycles of operation. Additionally, by the use of a C-shaped channel, the width of the seal 60 (FIGS. 4 and 5) extends over the peripheral edge 27 of the underlying support table, improving the vacuum seal drawn upon the outer surface 35 of bag 30 by vacuum applied to the vacuum channel 21. Thus, the increased area 63 (FIG. 4) of the seal 60 firmly seats against the outer periphery 27 of the work surface 19 improving the vacuum seal such that a single vacuum pump 25 can be employed and need only be operated when the vacuum is being drawn as opposed to the prior art system where the vacuum pump was of necessity continuously run. In some embodiments, the first or second fasteners may be extended from the frame channel 50 itself or the channel may integrally include threaded fasteners such as spaced-apart threaded apertures. Such a reversal of parts and various other modifications to the preferred embodiment of the invention as described herein can be made without departing from the spirit or scope of the invention as defined by the appended claims.

The invention claimed is:

1. A laminating press which includes a generally rectangular frame to which a vacuum bag is attached thereto comprising:
   a plurality of first threaded fasteners extending from said frame around the outer periphery thereof near a lower surface;
   a backing member having a plurality of apertures aligned with said threaded fasteners of said frame; and
   a plurality of second threaded fasteners attached to said first threaded fasteners such that an edge of said vacuum bag can be extended over said first threaded fasteners with said second threaded fasteners compressibly holding the edge of said vacuum bag between said frame and said backing member.

2. The press as defined in claim 1 and further including a channel mounted to said frame and extending therealong and wherein said first threaded fasteners are secured to said channel.

3. The press as defined in claim 2 wherein said channel is a C-shaped channel.

4. The press as defined in claim 3 wherein said first threaded fasteners are studs.

5. The press as defined in claim 4 wherein said second threaded fasteners are nuts.

6. The press as defined in claim 5 further includes a sealing member mounted to the lower surface of said frame and extending under a lower flange of said C-shaped channel.

7. A laminating press comprising:
   a generally rectangular frame for attaching a flexible membrane thereto;
   a plurality of first threaded fasteners extending from said frame around the outer periphery thereof near a lower surface;
   a flexible membrane shaped to extend over the edges of said frame;
   a backing member having a plurality of apertures aligned with said threaded fasteners of said frame; and
   a plurality of second threaded fasteners attached to said first threaded fasteners such that an edge of said flexible membrane can be extended over said first threaded fasteners with said second threaded fasteners compressibly holding the edge of said membrane between said frame and said backing member.

8. The press as defined in claim 7 and further including a channel mounted to said frame and extending therealong and wherein said first threaded fasteners are secured to said channel.

9. The press as defined in claim 8 wherein said channel is a C-shaped channel.

10. The press as defined in claim 9 wherein said first threaded fasteners are studs.

11. The press as defined in claim 10 wherein said second threaded fasteners are nuts.

12. The press as defined in claim 11 further includes a sealing member mounted to the lower surface of said frame and extending under a lower flange of said C-shaped channel.

13. A laminating press which includes a generally rectangular frame for attaching a vacuum bag thereto comprising:
   a C-shaped channel coupled to and extending along the outer lower edges of said frame with a lower flange of said C-shaped channel coplanar with the lower surface of said frame;
   a plurality of first threaded fasteners extending from said channel around the outer periphery thereof near a lower surface;
   a backing member having a plurality of apertures aligned with said threaded fasteners of said channel; and
   a plurality of second threaded fasteners attached to said first threaded fasteners such that an edge of a vacuum bag can be extended over said first threaded fasteners with said second threaded fasteners compressibly holding the edge of the vacuum bag between said frame and said backing member.

14. The press as defined in claim 13 and further including a seal mounted to said frame and extending under said lower flange of said channel.

15. The press as defined in claim 14 wherein said seal is made of a resilient polymeric material.

16. The press as defined in claim 15 wherein said first threaded fasteners are studs.

17. The press as defined in claim 16 wherein said second threaded fasteners are nuts.

18. The press as defined in claim 17 wherein said backing member comprises a flat elongated bar.

19. The press as defined in claim 18 wherein said C-shaped channel has upper and lower flanges and said bar has a width to extend between said flanges.

20. The press as defined in claim 19 and further including an angle bracket mounted to each corner of said frame for holding the corners of a vacuum bag to the corners of said frame.

* * * * *